350-167　　　　　SR
8/22/78　　　XR　　4,108,157

United States Patent [19]
Gorniak

[11] 4,108,157
[45] Aug. 22, 1978

[54] SOLAR ENERGY COLLECTOR

[76] Inventor: Jerry Gorniak, 2317 E. 43rd St., Erie, Pa. 16510

[21] Appl. No.: 779,079

[22] Filed: Mar. 18, 1977

Related U.S. Application Data

[63] Continuation-in-part of Ser. No. 577,259, Jul. 13, 1975, Pat. No. 4,029,077.

[51] Int. Cl.$^2$ ............................................. F24J 3/02
[52] U.S. Cl. ................................... 126/271; 350/167
[58] Field of Search ............... 126/270, 271; 237/1 A; 350/167; 60/641

[56] References Cited
U.S. PATENT DOCUMENTS

| | | | |
|---|---|---|---|
| 2,595,905 | 5/1952 | Telkes | 126/270 |
| 4,026,269 | 5/1977 | Stelzer | 126/270 |
| 4,029,077 | 6/1977 | Gorniak | 126/271 |

Primary Examiner—Kenneth W. Sprague
Assistant Examiner—James C. Yeung
Attorney, Agent, or Firm—Charles L. Lovercheck

[57] ABSTRACT

A solar energy collector having a hollow, pyramidal-shaped body made of insulation material and a fluid conducting coil of heat conducting tubing extending around the inside of the body. The outer case or shell has a fluid coil to sense heat and cold of liquid flowing to the fluid bed. A plurality of sheets of rigid material support alternate layers of liquid and lenses which focus sunlight onto the layers of liquid and onto the coils of tubing thereby heating the liquid. The liquid in each of the coils is connected to separate thermostatically controlled louvers to open when the outside air temperature reaches a predetermined value and to close when there is no ambient sunlight. The collector operates day and night, the year around, collecting and storing heat.

3 Claims, 3 Drawing Figures

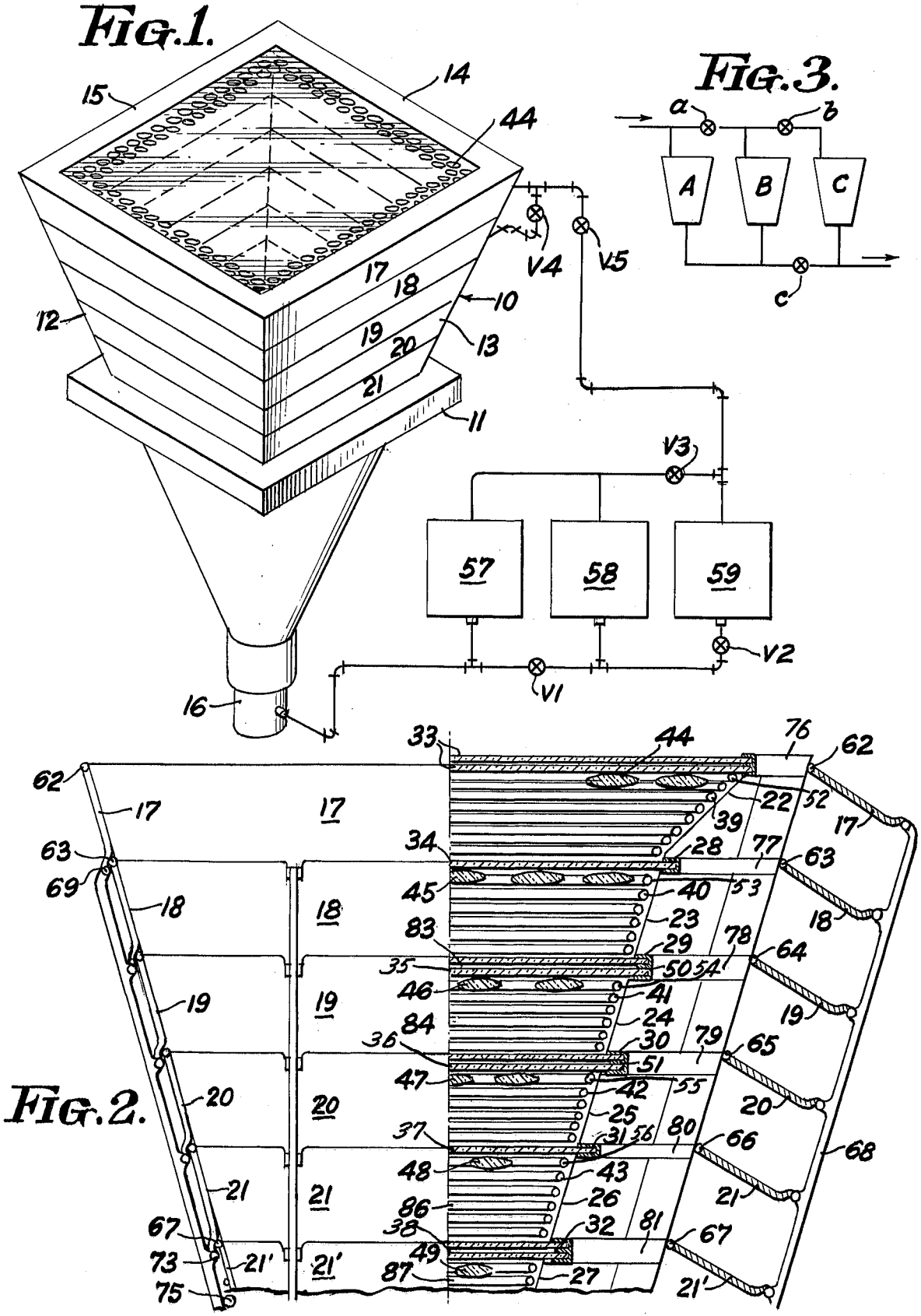

SOLAR ENERGY COLLECTOR

REFERENCE TO CO-PENDING APPLICATION

This application is a continuation-in-part of patent application Ser. No. 577,259 filed on June 13, 1975 now U.S. Pat. No. 4,029,077, by Jerry Gorniak.

REFERENCE TO PRIOR ART

Various solar batteries have been made as shown in U.S. Pat. Nos. 3,104,210; 3,171,403; 3,446,119; 3,493,491; and 3,780,722, for example, but none of these patents show the idea of focusing the sunlight on layers of liquid, such as disclosed in the present application.

OBJECTS OF THE INVENTION

It is an object of the invention to provide an improved solar energy collector.

Another object of the invention is to provide a solar energy collector that is simple in construction, economical to manufacture and simple and efficient to use.

With the above and other objects in view, the present invention consists of the combination and arrangement of parts hereinafter more fully described, illustrated in the accompanying drawing and more particularly pointed out in the appended claims, it being understood that changes may be made in the form, size, proportions, and minor details of construction without departing from the spirit or sacrificing any of the advantages of the same.

GENERAL DESCRIPTION OF THE DRAWINGS

FIG. 1 is an isometric view of the solar collector according to the invention.

FIG. 2 is a longitudinal cross-sectional partial view of the solar collector.

FIG. 3 shows an arrangement of batteries similar to FIG. 1 connected in lines for either series or parallel connection.

DETAILED DESCRIPTION OF THE DRAWINGS

Now, with more particular reference to the drawings, a solar collector indicated generally at 10. It is a body that is in the shape of an inverted hollow pyramid and is supported on the frame 11 which may have suitable supporting legs. The collector has sides 12, 13, 14 and 15 which define the outer edges of the pyramid terminating in the end 16.

The body has rectangular open supporting frames 76, 77, 78, 79, 80 and 81. Hingedly attached to the supporting frames are louvers 17, 18, 19, 20, 21, and 21' respectively. The solar collector is divided into sections 82, 83, 84, 85, 86 and 87 which are stacked on each other and have inclined inner surfaces 22, 23, 24, 25, 26 and 27 with spaces 28, 29, 30, 31 and 32 providing notches which receive the outer edges of the rigid sheets 33, 34, 35, 36, 37 and 38. Each side 12, 13, 14 and 15 has louvers 17, 18, 19, 20, 21 and 21' which are hinged to the frames 76, 77, 78, 79, 80 and 81 at 62, 63, 64, 65, 66 and 67 respectively and operating link 68 is pivoted to louvers 17, 18, 19, 20, 21 and 21' at 69, 70, 71, 72, 73 and 74 respectively. The louvers on each side can be opened and closed by means of these links and a suitable latch indicated at 75 can be used to hold them.

The first coil 39, second copper coil 40, third copper coil 41, fourth copper coil 42, fifth copper coil 43 are supported adjacent to surfaces 22, 23, 24, 25, 26 and 27 respectively.

The lenses 44 are supported in two rows around the outer periphery of the open top in a common plane, the second lenses 45 are fixed to the lower surface of the sheet 34 in a plane parallel to the plane containing lenses 44. The lenses 46 are fixed to the lower sheet 35 in a third plane, lenses 47 are fixed to the lower sheet 36 in a fourth plane parallel to the plane of the other lenses. Additional lenses could be supported to the bottom of sheets 37 and 38 and additional sheets could be provided.

The sheets 35 and 47 have a sealing member 50 around the outer periphery providing a space for liquid therebetween and sheets 36 and 49 have a sealing member 51 around the outside providing a space for liquid between them.

Suitable pipe connections 52, 53, 54, 55 and 56 are connected to coils 39, 40, 41, 42 and 43 respectively and could be connected to the liquid between the respective sheets.

Suitable thermostatic valves V-1, V-2, V-3, V-4 and V-5 connect a line 52, 53, 54, 55 and 56 respectively to tanks or batteries 57, 58 and 59 respectively. These valves V-1, V-2, V-3, V-4 and V-5 can be controlled by a device sensitive to sunlight so that they will be closed when there is no sunlight available to heat the liquid in the battery.

It will be noted that the sheet of water may be disposed between any number of rigid sheets and any number of lenses can be attached to the sheets.

The first lenses 44 and the second lenses 45, third lenses 46 and fourth lenses 48 will all be made of conventional lens material such as glass or suitable plastic material having desired optical characteristics. Instead of supporting the lenses on the rigid sheets, the lenses could be molded from single sheets of plastic material with the spaces between them defining webs through which sunlight might pass but would be recaptured by the next row of lenses therebelow.

It will be noted that the lenses fixed at their midpoint to the edge of the rigid sheet 34 focus sunlight that passes between the spaces from the lenses 46 above onto the sheet of water 83 therebelow and the lenses 44 focus their light on the coil 39 thereby heating the water in the coil.

The embodiment of the invention shown in FIG. 3, the solar heating units A, B and C are similar to the ones shown in FIG. 1. These units A, B and C can be connected so that the liquid flows through the A, B and C units in a series by opening valve b and closing valves a and c, for example. To operate the two units in parallel, valves a, b and c are all open. In a like manner, the batteries 57, 58 and 59 may be connected in a series with each other by closing valves V-1, V-3 and opening V-2.

A deicing coil can be provided around the collector and liquid from the top layer of lenses 44 can be directed through the coil to heat and deice the outer surface of the collector by properly segregating the flow of fluid from the collector to the battery by means of the valves V-4 and V-5.

Several collectors, A, B and C, similar to the collector 10, can be connected together to increase the temperature of the liquid either by connecting them in series or with each other or in parallel with each other by means of valves a, b and c as shown in FIG. 3.

The louvers can be opened and closed by means of a suitable motor indicated at M which may be thermostatically controlled to open the louvers when the outside air temperature is at an extremely low value and to open when the temperature is normal, for example, between 32° F and 90° F.

The heat from the upper row 44 of lenses can be directed by means of fluid flowing from it to a suitable heating jacket around the outside of the collector for melting snow and ice off of it in severe weather.

Additional batteries similar to batteries 57, 58 and 59 can be connected to the collector 10 by suitable valves at night and the cooling effect of ambient air on the collector can be used to cool water in such batteries to provide cold water.

The foregoing specification sets forth the invention in its preferred, practical forms but the structure shown is capable of modification within a range of equivalents without departing from the invention which is to be understood is broadly novel as is commensurate with the appended claims.

The embodiments of the invention in which an exclusive property or privilege is claimed are defined as follows:

1. A solar collector comprising a fluid path for a liquid having a plurality of turns disposed generally in a hollow pyramidal body,
    a plurality of storage tanks,
    a plurality of first lenses,
    a first sheet means supporting said lenses,
    said first lenses having spaced from them a first fluid path for liquid,
    said first fluid path for liquid being disposed a distance from said lenses a distance substantially equal to the focal length of said first lenses,
    means to conduct said liquid from said fluid path to a heat battery,
    said fluid path comprising a first coil of tubing,
    a second sheet of rigid material disposed generally parallel to said first sheet,
    and a third sheet of rigid material spaced from said second sheet generally parallel to said first sheet of material supporting a sheet of water,
    a plurality of second lenses fixed to said second sheet of material to the underside thereof,
    and second lenses being spaced from said sheet of water a distance substantially equal to the focal length of said second lenses,
    a plurality of louvers,
    hinge means swingably supporting said louvers on said body,
    and means for opening and closing said louvers.

2. The collector recited in claim 1 wherein said means for opening and closing said louvers comprises,
    thermostatic control means for opening and closing said louvers in response to the outside temperature around said collector.

3. The collector recited in claim 1 wherein a plurality of fluid tanks are provided,
    a plurality of fluid lines connect said tanks to said fluid paths and a thermostatically controlled valve is disposed in said fluid line adapted to open said fluid line when fluid temperature reaches a predetermined value.

* * * * *